United States Patent
Baik et al.

(10) Patent No.: US 9,086,613 B1
(45) Date of Patent: Jul. 21, 2015

(54) CAMERA MODULE AND AUTOFOCUS METHOD THEREOF

(71) Applicant: SAMSUNG ELECTRO-MECHANICS CO., LTD., Suwon-Si (KR)

(72) Inventors: Jae Ho Baik, Suwon-Si (KR); Shin Young Cheong, Suwon-Si (KR); Yoo Chang Kim, Suwon-Si (KR); Kyeong Jun Kim, Suwon-Si (KR); Sung Hoon Kim, Suwon-Si (KR); Hee Soo Yoon, Suwon-Si (KR); Jung Seok Lee, Suwon-Si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 14/311,216

(22) Filed: Jun. 20, 2014

(30) Foreign Application Priority Data

Mar. 12, 2014 (KR) .................. 10-2014-0029260
Apr. 10, 2014 (KR) .................. 10-2014-0043142

(51) Int. Cl.
*G03B 13/36* (2006.01)

(52) U.S. Cl.
CPC .................................... *G03B 13/36* (2013.01)

(58) Field of Classification Search
CPC ................................ G03B 13/34; G03B 13/36
USPC ........................................ 396/133, 104, 125
See application file for complete search history.

(56) References Cited

U.S. PATENT DOCUMENTS

| 8,036,521 | B2* | 10/2011 | Ono et al. ..................... 396/104 |
| 2006/0165403 | A1 | 7/2006 | Ito |
| 2007/0104043 | A1 | 5/2007 | Bammert |
| 2010/0226637 | A1* | 9/2010 | Kanda et al. .................. 396/133 |
| 2011/0236008 | A1 | 9/2011 | Kang |
| 2014/0355973 | A1* | 12/2014 | Cadugan et al. .............. 396/133 |

FOREIGN PATENT DOCUMENTS

| JP | 2006-294157 A | 10/2006 |
| JP | 2007-134033 A | 5/2007 |
| JP | 2009-163153 A | 7/2009 |
| JP | 2012-208063 A | 10/2012 |
| JP | 2012-222471 A | 11/2012 |
| KR | 10-2006-0086866 A | 8/2006 |
| KR | 10-2011-0106664 A | 9/2011 |
| KR | 10-2013-0043925 A | 5/2013 |
| WO | 2013/058474 A1 | 4/2013 |

* cited by examiner

Primary Examiner — W B Perkey
(74) Attorney, Agent, or Firm — NSIP Law

(57) ABSTRACT

A camera module in which a focal distance is adjusted by an actuator may include a permanent magnet and a coil. A neutral zone spatially dividing first and second polarities of the permanent magnet may be formed at a portion of the permanent magnet facing a sensing sensor sensing magnetic flux.

15 Claims, 7 Drawing Sheets

CAMERA MODULE AND AUTOFOCUS METHOD THEREOF

CROSS-REFERENCE TO RELATED APPLICATIONS

This application claims the benefit of Korean Patent Application No. 10-2014-0029260 filed on Mar. 12, 2014, and 10-2014-0043142 filed on Apr. 10, 2014, with the Korean Intellectual Property Office, the disclosures of which are incorporated in their entireties herein by reference.

BACKGROUND

The present disclosure relates to a camera module including an actuator for adjusting a focal distance and an autofocus method thereof.

A camera module includes an actuator for adjusting a focal distance. In such an actuator, the actuator may include a permanent magnet generating electromagnetic force and a coil. However, since the actuator as described above does not have uniform linearity in view of a change in electromagnetic force depending on positions of the permanent magnet and the coil, it may be difficult to precisely adjust a focal distance of the camera module.

SUMMARY

Some embodiments of the present disclosure may provide a camera module capable of reliably adjusting a focal distance and an autofocus method thereof.

In a camera module according to an exemplary embodiment of the present disclosure, a neutral zone is formed in a permanent magnet, such that driving reliability and driving linearity of an actuator may be improved.

Further, in a camera module according to an exemplary embodiment of the present disclosure, a sensing sensor measuring magnetic flux density is arranged in a neutral zone of a permanent magnet, such that driving reliability and driving linearity of an actuator may be improved.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
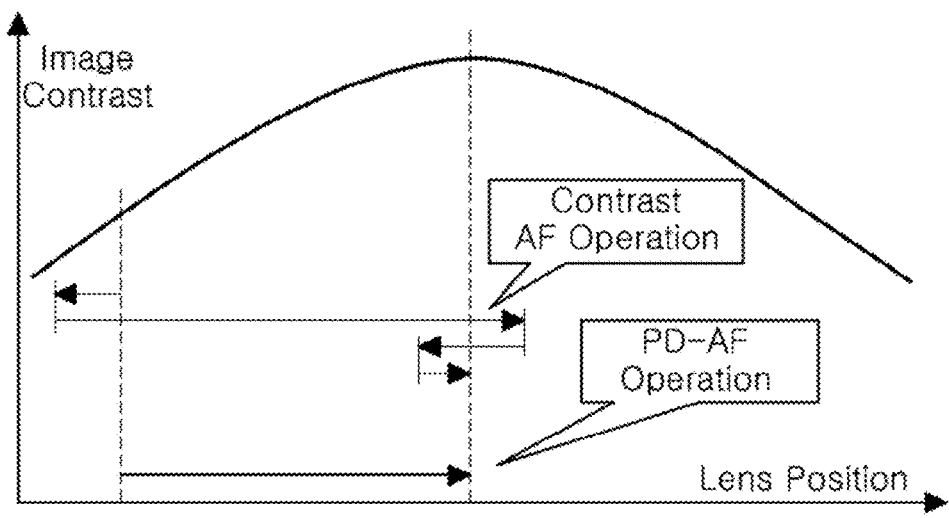
FIG. 1 is a graph for describing an autofocus (AF) mode.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

In addition, hereinafter, a "height" means a length in a direction generally parallel with an optical axis direction, and a "width" means a length in a direction vertical to an optical axis.

An autofocus (AF) mode will be described with reference to FIG. 1.

In the case of a contrast AF mode, an autofocus mode using an actuator in a camera for a mobile phone, the autofocus may be performed without additional equipment. However, in this mode, in the case in which capacity of data to be process is increased due to high pixel density, a control time for autofocus may be increased.

An autofocus control time may be an important factor affecting quality of imaging an instant motion. The autofocus control time may be decreased by an AF mode using infrared light or an AF mode using a phase difference (PD). However, since additional hardware is required in order to use this method, it may be difficult to use this method in a small-sized terminal (for example, a portable phone). Therefore, the present applicant developed PD-AF, calculating a defocus amount without an additional hardware by appropriately disposing a position sensor in an image sensor. For reference, in the camera module, a difference in AF time may be about 0.2 S.

Figure 2:
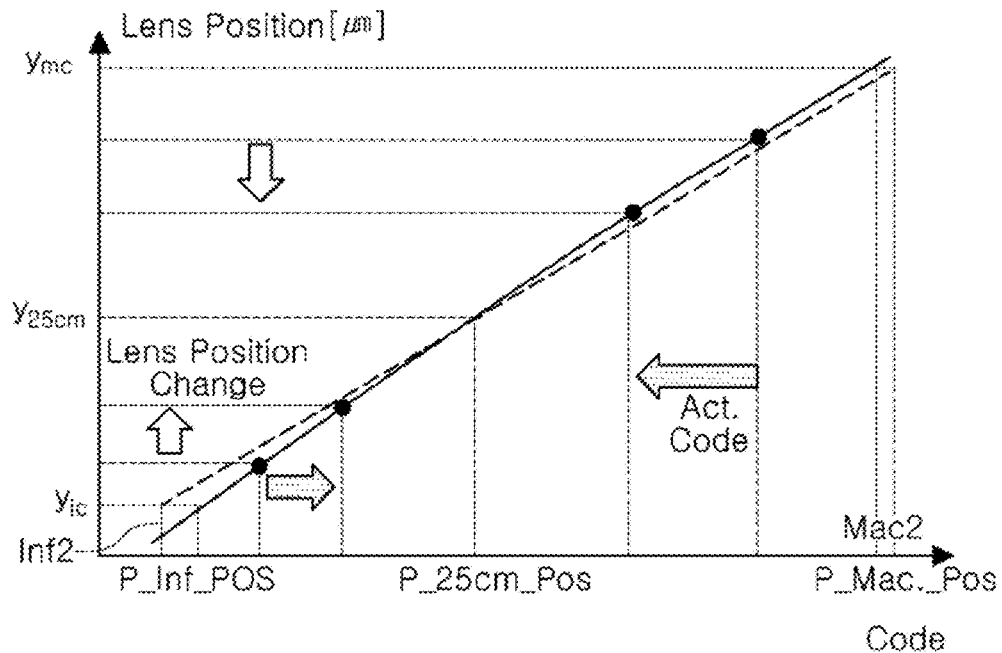
FIG. 2 is a graph showing linearity of a phase difference AF mode and a contrast AF mode.
Figure 2:
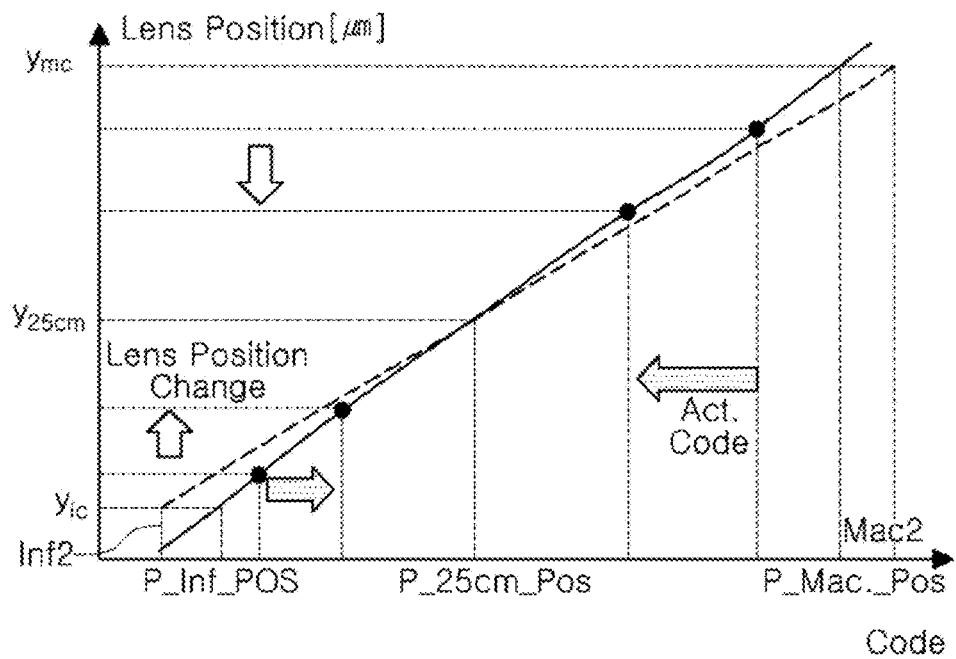

Hereinafter, present problems of a phase difference AF mode will be briefly described with reference to FIG. 2.

In order to apply the phase difference AF mode, it may be important to secure linearity of an AF actuator. In the case in which the linearity of the AF actuator is not secured, a difference between a code value of the contrast AF mode and a prediction code value of the phase difference AF mode may be increased. For example, in the case of adjusting an autofocus distance by the phase difference AF mode and then correcting the autofocus distance by the contrast AF mode, reliability of autofocus control may be deteriorated due to a deviation between two modes.

The present disclosure may provide a method capable of solving the problem as described above and increasing linearity of the AF actuator.

As an example, according to the present disclosure, linearity of the AF actuator may be improved by forming a neutral zone (a zone at which magnetic force having a first polarity and magnetic force having a second polarity are generally offset to each other) in a permanent magnet formed by magnetizing two pole faces.

As another example, according to the present disclosure, distortion of an input magnetic flux value generated by a magnetic field system may be decreased by disposing a sensor sensing magnetic flux density in the neutral zone of the permanent magnet, such that linearity of the AF actuator may be improved.

Figure 3:
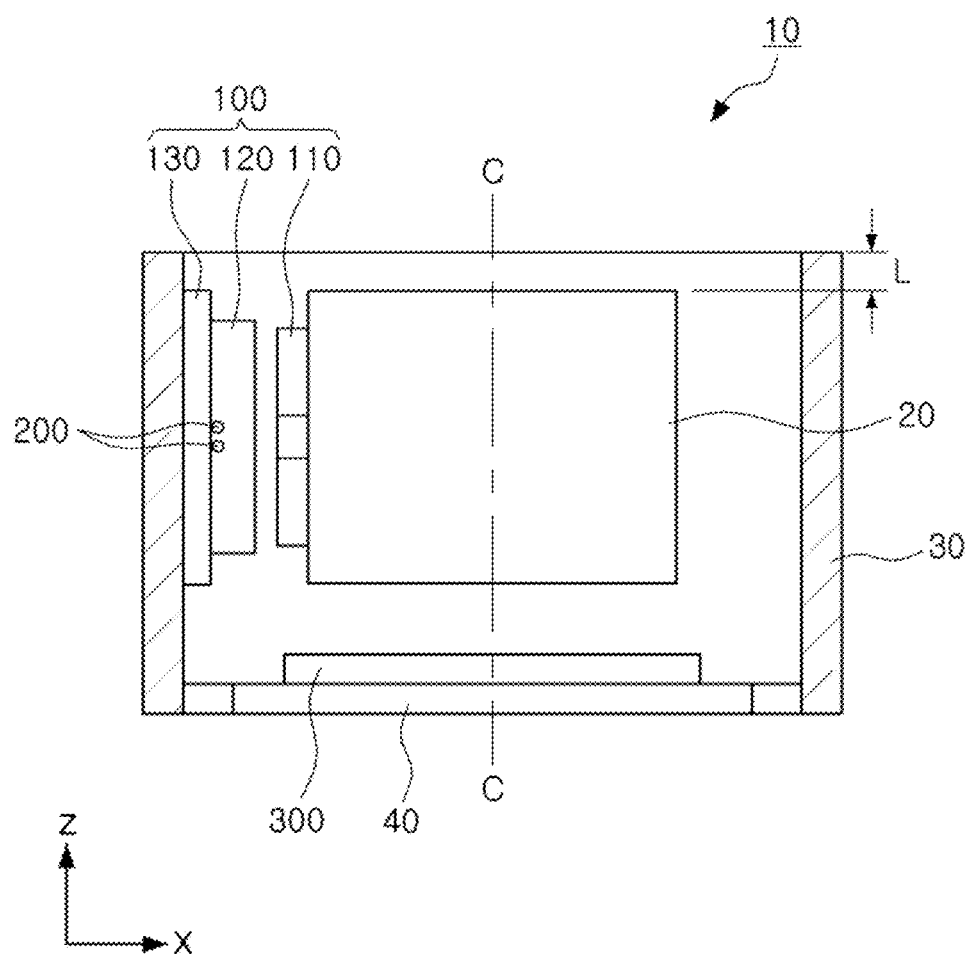
FIG. 3 is a configuration diagram of a camera module according to an exemplary embodiment of the present disclosure.

Hereinafter, main configurations of a camera module will be described with reference to FIG. 3.

The camera module 10 may include a lens barrel 20, a housing 30, and a substrate 40. In addition, the camera module 10 may include an image sensor 300 configured so as to convert light incident through the lens barrel 20 into image signals. Further, the camera module 10 may include an actuator 100 configured so as to adjust a position of the lens barrel 20 with respect to the image sensor 300.

In the camera module 10 configured as described above, the lens barrel 20 may be moved in a direction parallel with an optical axis C-C by the actuator 100. For example, the lens barrel 20 may have a predetermined driving distance L. Therefore, the camera module 10 may adjust a focal distance by moving the lens barrel 20. For reference, in the present exemplary embodiment, the driving distance L of the lens barrel 20 may be 0.3 mm to 0.5 mm.

The actuator 100 may include a permanent magnet 110, a coil 120, and a yoke 130. Here, the permanent magnet 110 is arranged at the lens barrel 20, and the coil 120 and the yoke 130 are arranged at the housing 30. However, arrangement positions of the permanent magnet 110, the coil 120, and the yoke 130 are not limited thereto. For example, the permanent magnet 110 is arranged at the housing 30, and the coil 120 and the yoke 130 are arranged at the lens barrel 20.

The actuator 100 may further include sensing sensors 210 and 220. For example, the actuator 100 may further include one or more sensing sensors 210 or 220 arranged so as to face the permanent magnet 110. An arrangement of the sensing sensors 210 and 220 will be described again in a description of FIG. 7.

Figure 4:
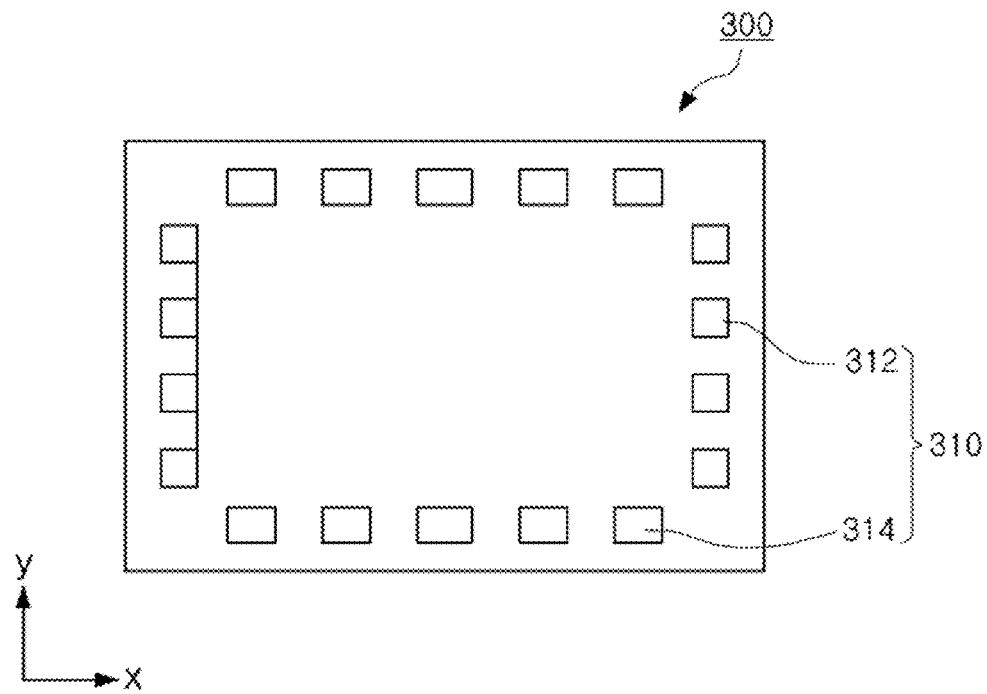
FIG. 4 is a plan diagram of an image sensor shown in FIG. 3.

Thereafter, the image sensor 300 will be described with reference to FIG. 4.

The image sensor 300 may convert incident light into electric image signals. Further, the image sensor 300 may sense a phase difference of the incident light. To this end, the image sensor 300 may include a plurality of phase difference sensing parts 312 and 314 as shown in FIG. 4.

The phase difference sensing parts 312 and 314 may be formed at an edge of the image sensor 300. In this case, a resolution degradation phenomenon by the phase difference sensing parts 312 and 314 may be significantly decreased. In addition the phase difference sensing parts 312 and 314 may be formed in plural zones. For example, the first phase difference sensing parts 312 may be formed in the image sensor 300 in a first direction (Y axis direction based on FIG. 4) to sense a phase difference in the first direction. In addition, the second phase difference sensing parts 314 may be formed in the image sensor 300 in a second direction (X axis direction based on FIG. 4) to sense a phase difference in the second direction.

Figure 5:
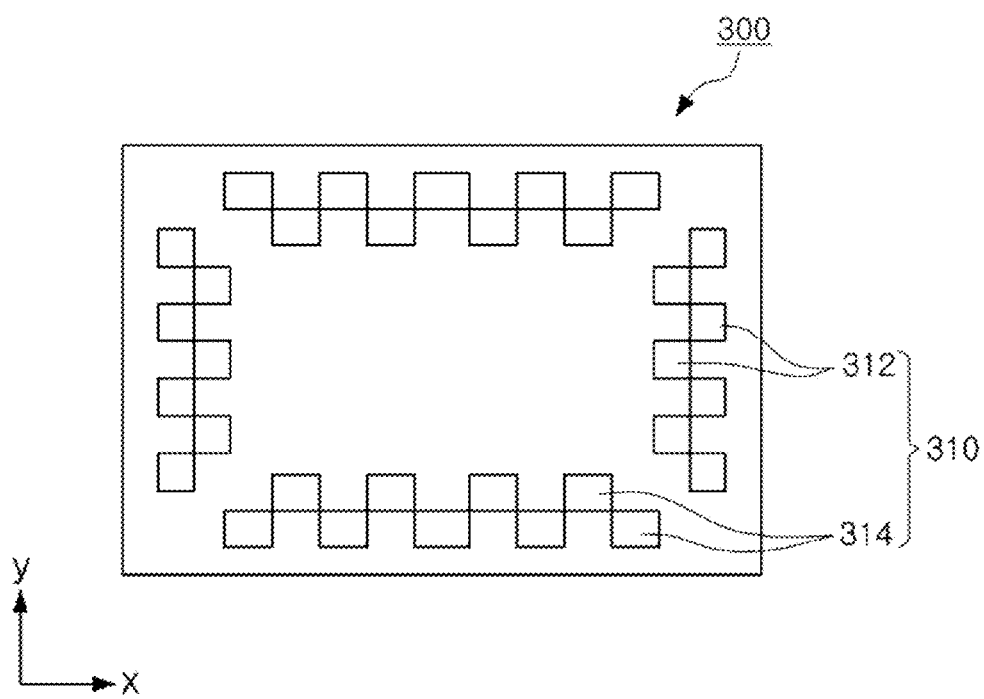
FIG. 5 is a plan diagram of another embodiment of an image sensor shown in FIG. 3.

Thereafter, another example of the image sensor 300 will be described with reference to FIG. 5.

The image sensor 300 may include a plurality of phase difference sensing parts 312 and 314 arranged in a plurality of rows. For examples, the first phase difference sensing parts 312 may be formed in 4 rows in the image sensor 300 in the first direction, and the second phase difference sensing parts 314 may be formed in 4 rows in the image sensor 300 in the second direction. Further, a plurality of phase difference sensing parts 312 and 314 adjacent to each other may be formed so as to be misaligned with each other. The phase difference sensing parts 312 and 314 may be advantageous for sensing a fine phase difference of incident light. Therefore, this image sensor 300 may improve reliability at the time of adjusting the autofocus distance using the phase difference.

Hereinafter, main configurations of the actuator for an autofocus (AF) operation of the camera module will be described with reference to FIG. 6.

The actuator 100 according to the present disclosure may include the permanent magnet 110 and a sensing sensor 200 (210 and 220). In addition, the actuator 100 may additionally further include the yoke 130 and a driving IC 40. The actuator configured as described above may be driven in the phase difference AF mode. In addition, the actuator may be driven in the contrast AF mode. For example, the actuator may adjust the focal distance in the phase difference AF mode and correct the focal distance in the contrast AF mode. However, the actuator does not perform both of the above-mentioned modes. For example, the actuator may adjust the focal distance using only the phase difference AF mode as needed.

The permanent magnet 110, the coil 120, and the yoke 130 may be arranged so as to have predetermined gaps therebetween. For example, the permanent magnet 110 and the coil 120 may be arranged so as to have a first gap G1 therebetween, and the coil 120 and the yoke 130 may be arranged so as to have a second gap G2. In addition, the permanent magnet 110 and the sensing sensor 200 may be arranged so as to have a third gap (G1+Td).

Figure 6:
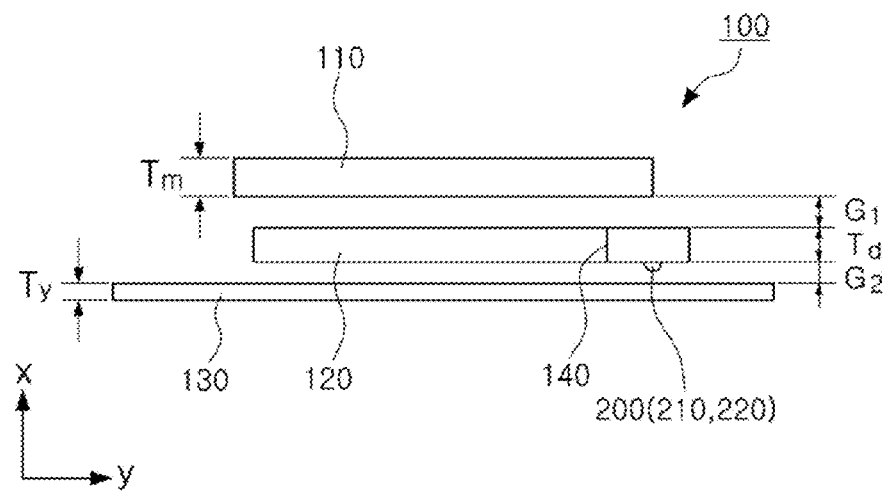
FIG. 6 is a plan diagram of main configurations of an actuator shown in FIG. 3.

For reference, reference numeral Tm, Td, and Ty that are not described in FIG. 6 are a thickness of the permanent magnet 110, a thickness of the driving IC 140, and a thickness of the yoke 130, respectively. In the present exemplary embodiment, G1 may be 0.15 mm, Tm may be 0.45 mm, Td may be 0.45 mm, and Ty may be 0.13 mm. Therefore, a distance between the permanent magnet 110 and the sensing sensor 200 may be approximately 0.6 mm.

The sensing sensor 200 may be arranged so as to generally face the permanent magnet 110. Alternatively, the sensing sensor 200 may be arranged at a zone at which magnetic flux density of the permanent magnet 110 may be sensed. For example, the sensing sensor 200 may be arranged between the permanent magnet 110 and the coil 120 or at one portion of the coil 120 to sense the magnetic flux density of the permanent magnet 110. However, an arrangement position of the sensing sensor 200 is not limited to one portion of the coil 120. For example, the sensing sensor 200 may be arranged on a line connecting a bisecting line of the permanent magnet 110 and a bisecting line of the coil 120 to each other.

Figure 7:
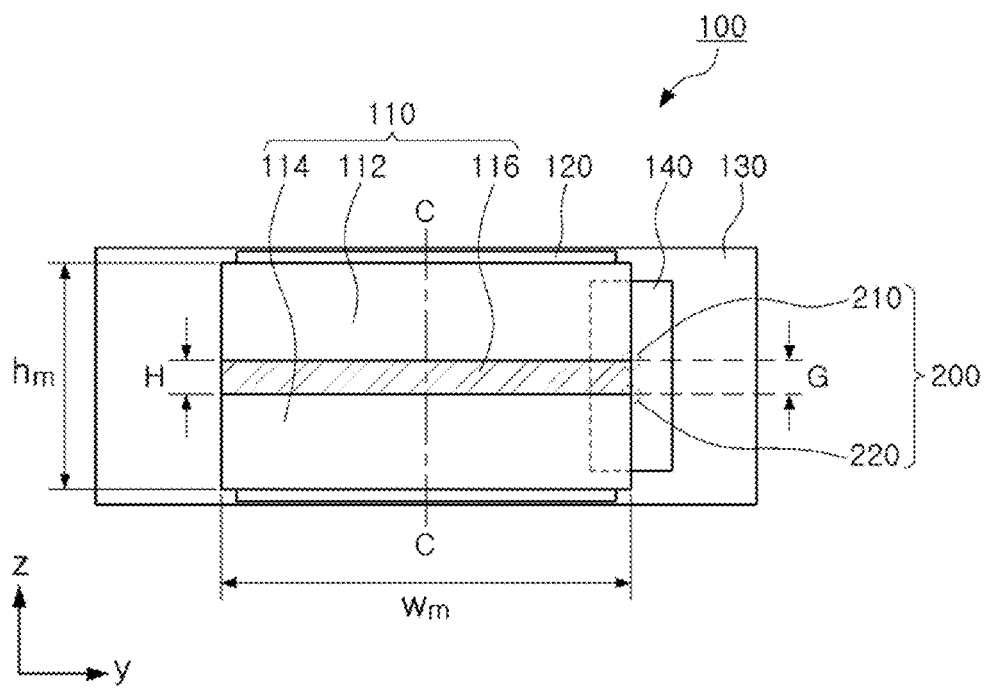
FIG. 7 is a front diagram of the main configurations of the actuator shown in FIG. 3.

A shape of the permanent magnet will be described with reference to FIG. 7.

The permanent magnet 110 may have a predetermined size. For example, the permanent magnet 110 may have a thickness tm of a first size, a height hm of a second size, and a width Wm of a third size. For reference, in the present exemplary embodiment, the thickness tm of the permanent magnet 110 is 0.45 mm, the height hm thereof is 2.7 mm, and the width Wm thereof is 4.5 mm. However, the thickness, the height, and the width of the permanent magnet 110 are not limited to the above-mentioned numerical values. For example, the thickness tm, the height hm, and the width Wm of the permanent magnet 110 may be changed according to a driving distance of the actuator.

The permanent magnet 110 is a magnet formed by magnetizing two pole faces. For example, a first zone 112 having a first polarity may be formed in one portion of the permanent magnet 110, and a second zone 114 having a second polarity may be formed in the other portion thereof. In addition, the neutral zone 116 that generally does not have a polarity may be formed between the first and second zones 112 and 114.

The neutral zone 116 may have a predetermined height H. As an example, the height H of the neutral zone 116 is 0.4 mm to 0.8 mm. As another example, the height H of the neutral zone 116 is 0.55 mm to 0.65 mm.

The height H of the neutral zone 116 may satisfy the following Correlation Equation with respect to the height hm of the permanent magnet 110.

$0.14 < H/hm < 0.32$  [Correlation Equation]

Alternatively, the height H of the neutral zone 116 may satisfy the following Correlation Equation with respect to the height hm of the permanent magnet 110.

$0.19 < H/hm < 0.26$  [Correlation Equation]

In addition, the height H of the neutral zone 116 may satisfy the following Correlation Equation with respect to the driving distance L of the actuator.

$0.89 < H/L < 2.67$  [Correlation Equation]

Alternatively, the height H of the neutral zone 116 may satisfy the following Correlation Equation with respect to the driving distance L of the actuator.

$1.22 < H/L < 2.17$  [Correlation Equation]

Hereinafter, the arrangement form of the sensing sensor will be described, still with reference to FIG. 7.

The sensing sensors 210 and 220 may sense the magnetic flux density of the permanent magnet 110. To this end, the sensing sensors 210 and 220 may be arranged so as to face the permanent magnet 110. For example, the sensing sensors 210 and 220 may be arranged at the housing 30. However, the arrangement positions of the sensing sensors 210 and 220 are not limited to the housing 30. For example, in the case in which the permanent magnet 110 is formed at the housing, the sensing sensors 210 and 220 may be arranged at the lens barrel 20.

The sensing sensors 210 and 220 may be arranged so as to generally face the neutral zone 116 of the permanent magnet 110. For example, at least one of the sensing sensors 210 and 220 may be arranged so as to face the neutral zone 116 of the permanent magnet 110 even though the lens barrel 20 moves in the optical axis direction. In this case, the sensing sensors 210 and 220 may accurately sense a change in the magnetic flux density caused by movement of the lens barrel 20. In addition, this arrangement form of the sensing sensors 210 and 220 may allow the change in the magnetic flux density to have linearity in a driving range of the lens barrel 20. For example, in the driving range of the lens barrel 20, driving displacement of the lens barrel 20 may be in proportion to the magnetic flux density sensed by the sensing sensors 210 and 220. Therefore, in the case in which the magnetic flux density sensed by the sensing sensors 210 and 220 is recognized, the driving displacement (that is, a current position) of the lens barrel 20 may be recognized. Therefore, according to the present exemplary embodiment, the lens barrel 20 may be accurately driven to the desired position by changing the magnetic flux density formed between the permanent magnet 110 and the coil 120, such that the focal distance of the camera module may be accurately adjusted.

The sensing sensors 210 and 220 may be arranged so as to be biased toward one portion of the permanent magnet 110. However, if necessary, the sensing sensors 210 and 220 may be arranged at positions generally coinciding with a central axis C of the permanent magnet 110. This arrangement form of the sensing sensors 210 and 220 as described above may not affect a change in the magnetic flux density between the permanent magnet 110 and the coil 120 but precisely sense the change in the magnetic flux density between the permanent magnet 110 and the coil 120.

The sensing sensors 210 and 220 may be provided in plural. For example, the number of sensing sensors 210 and 220 may be two. A plurality of sensing sensors 210 and 220 may be arranged so as to have a predetermined gap G in a height direction of the permanent magnet 110. For example, the gap G between the first and second sensing sensors 210 and 220 may be 0.30 mm to 0.34 mm.

The gap G between the sensing sensors 210 and 220 may satisfy the following Correlation Equation with respect to the height H of the neutral zone 116 of the permanent magnet 110.

$1.18 < H/G < 2.67$  [Correlation Equation]

Alternatively, the gap G between the sensing sensors 210 and 220 may satisfy the following Correlation Equation with respect to the height H of the neutral zone 116 of the permanent magnet 110.

$1.62 < H/G < 2.17$  [Correlation Equation]

The sensing sensors 210 and 220 may be arranged by a predetermined distance S (S=G1+Td) from the permanent magnet 110. For example, the sensing sensors 210 and 220 may face the permanent magnet 110 while having a distance S of 0.27 mm to 0.67 mm therebetween.

The distance S between the sensing sensors 210 and 220 and the permanent magnet 110 may satisfy the following Correlation Equation with respect to the height H of the neutral zone 116 of the permanent magnet 110.

$0.60 < H/S < 2.96$  [Correlation Equation]

Alternatively, the distance S between the sensing sensors 210 and 220 and the permanent magnet 110 may satisfy the following Correlation Equation with respect to the height H of the neutral zone 116 of the permanent magnet 110.

$0.82 < H/S < 2.41$  [Correlation Equation]

Meanwhile, the sensing sensors 210 and 220 may be formed at the driving IC 140. For example, the sensing sensors 210 and 220 may be integrally formed at one surface or a rear portion of the driving IC 140. However, formation positions of the sensing sensors 210 and 220 are not limited to the driving IC 140. For example, the driving IC 140 may be omitted.

The sensing sensors 210 and 220 may be arranged by a predetermined distance from the yoke 130. For example, the sensing sensors 210 and 220 may be arranged by a distance of 0.2 mm to 0.4 mm from the yoke 130. For reference, the thickness of the yoke 130 may be 0.1 mm to 0.15 mm.

The sensing sensors 210 and 220 may sense magnetic flux density in a predetermined range. For example, the sensing sensors 210 and 220 may sense magnetic flux density of −300 mT to 300 mT.

The maximum magnetic flux density Sf that may be sensed by the sensing sensors 210 and 220 may satisfy the following Correlation Equations with respect to the height H of the neutral zone 116 of the permanent magnet 110:

$-3.0 < Sf/(S*H) < 0.6$  [Correlation Equation]

$-0.1 < Sf/(Wm*H) < 0.1$  [Correlation Equation]

$2.79 < (Mf*H)/(Sf*S) < 13.83$  [Correlation Equation]

$3.83 < (Mf*H)/(Sf*S) < 11.23$  [Correlation Equation]

where, Sf is maximum magnetic flux density [T] that may be sensed by the sensing sensor, Mf is magnetic flux density

[T] of the permanent magnet 110, S is the distance [mm] between the permanent magnet 110 and the sensing sensors 210 and 220, Wm is the width [mm] of the permanent magnet, and H is the height [mm] of the neutral zone 116).

For reference, in the present exemplary embodiment, the magnetic flux density of the permanent magnet is 1.4 T.

Figure 8:
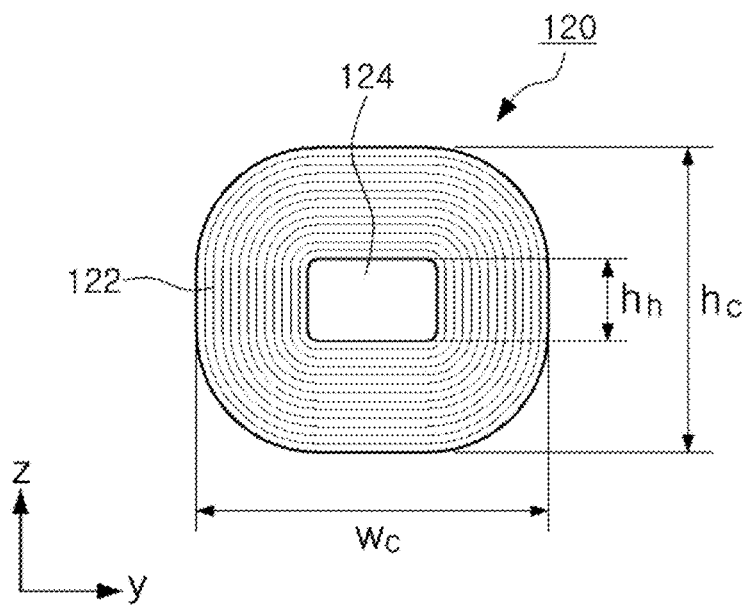
FIG. 8 is a front diagram of a coil of the actuator shown in FIG. 3.

Next, the coil 120 will be described with reference to FIG. 8.

The coil 120 may generally have a size equal or similar to that of the permanent magnet 110. For example, a height hc of the coil 120 may be equal or similar to the height hm of the permanent magnet 110, and a width Wc of the coil 120 may be equal or similar to the width Wm of the permanent magnet 110. In addition, a thickness of the coil 120 may be generally equal to the thickness tm of the permanent magnet 110. For reference, in the present exemplary embodiment of the present disclosure, hc is 2.75 mm, Wc is 3.3 mm, and the thickness of the coil is 0.45 mm.

The coil 120 may have a shape in which a plurality of conductive wires 122 are wound. For example, the coil 120 may have a shape in which a wire having a diameter of 0.04 mm is wound 180 to 240 times. The coil 120 formed as described above may have a predetermined resistance. For example, the coil 120 may have a resistance of 15Ω to 30Ω.

A hollow part 124 may be formed at a central portion of the coil 120. The hollow part 124 may have a height generally equal or similar to the height H of the neutral zone 116. For example, in the present exemplary embodiment, the height hh of the hollow part 124 may be 0.5 mm to 0.7 mm and satisfy the following Correlation Equation with respect to the height H of the neutral zone 116.

$$0.5 < H/hh < 1.5 \quad \text{[Correlation Equation]}$$

Figure 9:
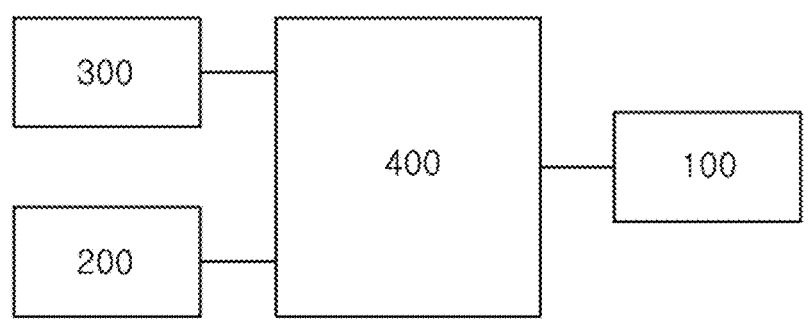
FIG. 9 is a configuration diagram showing a control relationship of the camera module shown in FIG. 3.

Then, a control structure of the actuator will be described with reference to FIG. 9.

Driving displacement of the actuator 100 may be determined by the magnetic flux density obtained from the sensing sensor 200 and the phase difference obtained from the image sensor 300. For example, an image signal processing (ISP) unit 400 may determine a current position of the lens barrel 20 through the magnetic flux density obtained from the sensing sensor 200 and calculate a focal distance (for example, a movement distance of the lens barrel 20) for implementing a vivid image through the phase difference obtained from the image sensor 300. In addition, the image signal processing unit 400 may compare the calculated focal distance and the current position of the lens barrel 20 with each other to determine a movement position of the lens barrel 20. When the movement position of the lens barrel 20 is determined, the image signal processing unit 400 may transmit electric signals to the actuator 100 to move the lens barrel 20.

Figure 10:
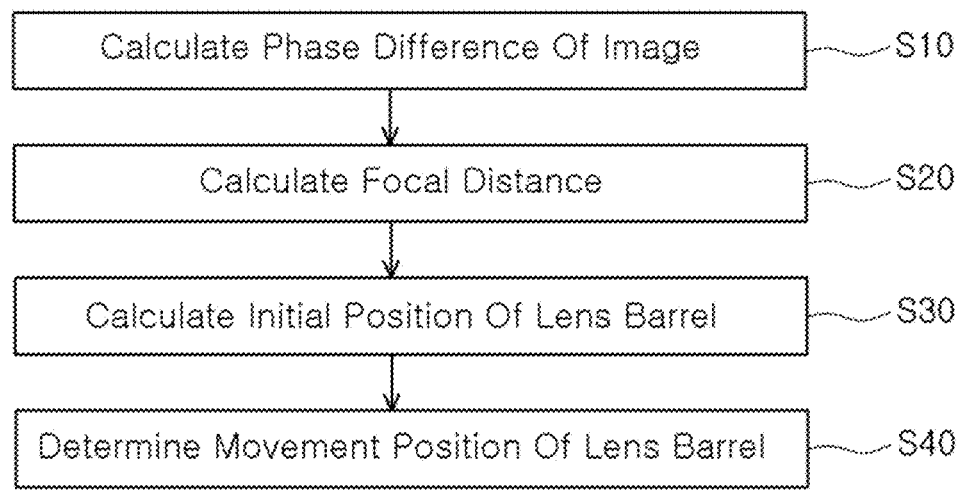
FIG. 10 is a flow chart showing an autofocus method of a camera module according to an exemplary embodiment of the present disclosure.

Hereinafter, an autofocus method of a camera module will be described with reference to FIG. 10.

The autofocus method of a camera module may include: a step of calculating a phase difference of an image (S10); a step of calculating a focal distance (S20); a step of calculating a position of a lens barrel (S30); and a step of determining a movement position of the lens barrel (S40).

1) Step of Calculating Phase Difference of Image (S10)

In this step, a phase difference of an image may be sensed. For example, phase difference sensing parts 312 and 314 of an image sensor 300 may sense a phase difference through incident image information.

2) Step of Calculating Focal Distance (S20)

In this step, a focal distance for implement a vivid image may be calculated. For example, an image signal processing unit 400 may compare the phase difference obtained from the phase difference sensing parts 312 and 314 with a first function (for example, a function indicating relationship a phase difference and a focal distance, which may be obtained by a pre-experiment) to calculate the focal distance. As an example, a focal distance corresponding to the obtained phase difference may be calculated based on a stored phase difference function. For reference, the image signal processing unit 400 may convert the calculated focal distance to a movement position of the lens barrel 20.

3) Step of Calculating Current Position of Lens Barrel (S30)

In this step, a current position of the lens barrel 20 may be calculated. The current position of the lens barrel 20 may be calculated through the magnetic flux density obtained from a sensing sensor 200. For example, the image signal processing unit 400 may compare the magnetic flux density obtained from the sensing sensor 200 with a second function (for example, a function indicating relationship between magnetic flux density and movement displacement of the lens barrel) to calculate the current position of the lens barrel 20.

4) Step of Determining Movement Position of Lens Barrel (S40)

In this step, a movement position of the lens barrel 20 may be determined. For example, the image signal processing unit 400 may compare the calculated focal distance and the current position of the lens barrel 20 with each other to determine a first movement position of the lens barrel 20 based on a deviation between two values. Here, the first movement position may be determined as a focal position of the camera module for imaging the corresponding image.

Meanwhile, the autofocus method of a camera module may further include a step of detecting contrast value and a step of correcting the movement position of the lens barrel.

5) Step of Detecting Contrast Value

In this step, a contrast value of the image incident through the lens barrel may be detected. For example, when the first movement position of the lens barrel is determined by the calculated phase difference, the image signal processing unit 400 may set a predetermined section including the first movement position and operate an actuator 100 so as to measure the contrast value in the section. In addition, the image signal processing unit 400 may determine the maximum contrast value among the measured contrast values and calculate a second movement position of the lens barrel corresponding to the determined maximum contrast value.

6) Step of Correcting Movement Position of Lens Barrel

In this step, a final movement position of the lens barrel may be determined. For example, the image signal processing unit 400 may compare the first movement position determined by the phase difference and the second movement position calculated by detecting the contrast value with each other, and determine one of the first and second movement positions as the focal position of the camera module when a deviation between the first and second movement positions is within an acceptable range. Unlike this, when the deviation between the first and second movement positions is out of the acceptable range, the image signal processing unit 400 may determine the second movement position as the focal position of the camera module.

In the actuator of the camera module configured as described above, relationship between the magnetic flux density and the driving displacement of the lens barrel may be linear in a range in which the above-mentioned Correlation Equations are satisfied. For example, in the case in which the height H of the neutral zone 116 of the permanent magnet 110 is 0.4 or less and the case in which the height H is 0.8 or more, the relationship between the magnetic flux density and the driving displacement of the lens barrel may be nonlinear. However, in the in the case in which the height H of the neutral zone 116 of the permanent magnet 110 is in a range of 0.4 to 0.8, the relationship between the magnetic flux density and the driving displacement of the lens barrel may be expressed by reliable linear Equation.

As set forth above, according to exemplary embodiments of the present disclosure, the camera module may reliably adjust the focal distance.

While exemplary embodiments have been shown and described above, it will be apparent to those skilled in the art that modifications and variations could be made without departing from the spirit and scope of the present disclosure as defined by the appended claims.

What is claimed is:

1. A camera module of which a focal distance is adjusted by an actuator including a permanent magnet and a coil,
    wherein a neutral zone spatially dividing first and second polarities of the permanent magnet is formed in a portion of the permanent magnet facing a sensing sensor sensing magnetic flux.

2. The camera module of claim 1, wherein the following Conditional Equation is satisfied:

$0.14 < H/hm < 0.32$  [Conditional Equation]

where H is a height of the neutral zone, and hm is a height of the permanent magnet.

3. The camera module of claim 1, wherein the following Conditional Equation is satisfied:

$0.5 < H/hh < 1.5$  [Conditional Equation]

where H is a height of the neutral zone, and hh is a hollow part of the coil.

4. The camera module of claim 1, wherein the following Conditional Equation is satisfied:

$0.89 < H/L < 2.67$  [Conditional Equation]

where H is a height of the neutral zone, and L is a driving distance of the actuator.

5. The camera module of claim 1, wherein the following Conditional Equation is satisfied:

$1.18 < H/G < 2.67$  [Conditional Equation]

where H is a height of the neutral zone, and G is a distance between a first sensing sensor arranged at a lowermost portion of the neutral zone and a second sensing sensor arranged at an uppermost portion thereof.

6. The camera module of claim 1, wherein the following Conditional Equation is satisfied:

$-3.0 < Sf/(S*H) < 0.6$  [Conditional Equation]

where SF is a sensitivity [T (tesla)] of the sensing sensor, S is a distance [mm] between the permanent magnet and the sensing sensor, and H is a height [mm] of the neutral zone.

7. The camera module of claim 1, wherein the following Conditional Equation is satisfied:

$-0.1 < Sf/(Wm*H) < 0.1$  [Conditional Equation]

where SF is a sensitivity [T (tesla)] of the sensing sensor, Wm is a width [mm] of the permanent magnet, and H is a height [mm] of the neutral zone.

8. The camera module of claim 1, wherein the sensing sensor is provided in plural and arranged to have a gap therebetween in a height direction of the neutral zone.

9. The camera module of claim 1, wherein the sensing sensor is arranged so as to be biased toward one portion based on a vertical bisecting line of the permanent magnet.

10. A camera module comprising:
    a permanent magnet formed at a lens barrel;
    a coil arranged so as to face the permanent magnet;
    a sensing sensor arranged so as to face a neutral zone formed between a first polarity zone of the permanent magnet and a second polarity zone thereof; and
    an image sensor including a phase difference sensing part.

11. The camera module of claim 10, wherein the first polarity zone, the neutral zone, and the second polarity zone are sequentially formed in an optical axis direction.

12. The camera module of claim 10, wherein the sensing sensor is provided in plural and arranged in an optical axis direction.

13. The camera module of claim 10, further comprising an image signal processing unit sensing a position of the lens barrel from electric signals obtained by the sensing sensor, calculating a focal distance from electric signals obtained by the phase difference sensing part, and determining a current magnitude supplied to the coil.

14. An autofocus method of a camera module, the autofocus method comprising:
    calculating a phase difference of an image incident on an image sensor;
    calculating a focal distance for imaging the image using the phase difference;
    calculating a current position of a lens barrel; and
    comparing the focal distance and the current position with each other to determine movement displacement of the lens barrel,
    wherein a position of the lens barrel is sensed through magnetic flux density changed in the vicinity of a neutral zone of a permanent magnet.

15. The autofocus method of claim 14, further comprising:
    detecting a contrast value of the image while moving the lens barrel based on the determined movement displacement; and
    determining a movement position at which the contrast value is maximum to determine final movement displacement of the lens barrel.

* * * * *